United States Patent [19]

Meurer

[11] Patent Number: 5,217,614
[45] Date of Patent: Jun. 8, 1993

[54] CLARIFIER WITH INTEGRAL TRUSSES

[76] Inventor: Charles L. Meurer, 2389 Bitterroot La., Golden, Colo. 80401

[21] Appl. No.: 889,777

[22] Filed: May 28, 1992

[51] Int. Cl.$^5$ .......................................... B01D 21/02
[52] U.S. Cl. ................... 210/521; 210/532.1; 210/538; 210/541
[58] Field of Search ...................... 210/521, 522, 532.1, 210/538, 519, 541, 802

[56] References Cited

U.S. PATENT DOCUMENTS

| | | | |
|---|---|---|---|
| 3,491,892 | 1/1970 | McCann | 210/521 |
| 3,963,624 | 6/1976 | Henderson et al. | 210/521 |
| 4,305,819 | 12/1981 | Kobozev et al. | 210/242.1 |
| 4,346,005 | 8/1982 | Zimmerman | 210/232 |
| 4,793,926 | 12/1988 | Vion | 210/521 |
| 4,933,524 | 6/1990 | Meurer | 210/521 |
| 5,028,333 | 7/1991 | Wright et al. | 210/521 |
| 5,049,278 | 9/1991 | Galper | 210/521 |

OTHER PUBLICATIONS

"Trac Vac" Advertising Brochure Metal Weave Stainless Steel Baffles.

Primary Examiner—Wilbur Bascomb, Jr.
Assistant Examiner—Christopher Upton
Attorney, Agent, or Firm—Rothgerber, Appel, Powers & Johnson

[57] ABSTRACT

Open frame, inverted-T-shaped trusses are provided between self-supporting clarifier units to support the units in liquid having solids therein flowing in a clarifier basin. In a first embodiment, each truss has three pipes which form part of a longitudinally extending base. A longitudinal spine extends up from the base to a fourth pipe which directly supports an outlet trough. Spaced supports extend transversely to form three-sided corners which receive an end of a clarifier unit. A bar extends between the spaced supports to hold the units in the corners. In a second embodiment, the truss is provided with a closed spine which serves as a head barrier at an inlet end of the basin.

14 Claims, 11 Drawing Sheets

CLARIFIER WITH INTEGRAL TRUSSES

BACKGROUND OF THE INVENTION

1. Field of the Invention

This invention relates to liquid treatment, and more particularly to providing support trusses integral with clarifier units in particle laden water, where such trusses minimally interfere with liquid flow and particle removal operations.

2. Description of the Prior Art

Water treatment facilities have been constructed without supports beneath clarifier or settler units. For example, in Kobozev et al. U.S. Pat. No. 4,305,819, floating structures are provided above depending clarifier units. However, vertical partition walls extend substantially below the tubes to define cells and eliminate turbulent flow at the inlet of the tubes.

In a variation of floating supports, in Zimmerman U.S. Pat. No. 4,346,005 an outer end of a tube module is hooked at the top to a launder and has a float at an inner end. As the tubes collect solids, the inner end of the tube module will sink and pivot around the launder hook, changing the angle of the tubes and their settling characteristics.

Also, attempts have been made to make clarifier units which are self-supporting so that they span spaced supports. One such unit, shown in McCann U.S. Pat. No. 3,491,892, has parallel vertical sheets held spaced and joined by baffles. When the baffles between alternate sheets are inclined in opposite directions, the sheets and baffles form truss-like structures which function as liquid-solids separators. Problems have still been experienced in supporting such truss-like clarifier structures. For example, in a rectangular basin embodiment of such structures, the McCann Patent shows an internal cutout for receiving a vertical pipe. The cutout blocks flow through some tubes of the separator, reducing the gallons per hour of throughput. Also, pipes are provided outside of each structure. The outer pipes prevent adjacent truss-like structures from being packed tightly together. As a result, in plan view, valuable liquid-solids separation area is lost.

In a circular settling tank embodiment, the McCann Patent also spaces adjacent separator units by such a large distance that 6-inch wide wooden members are required to stop short circuiting upwardly in radially extending spaces between the adjacent separator units. Although liquid will initially flow from the tubes of one separator unit to the tubes of an adjacent separator unit, it appears that as solids settle in the space between the adjacent units, more and more of such flow will be blocked.

Further, straps hang vertically to support pairs of L angles which extend under the separator units. The L angles also block short circuit flow between adjacent separator units. Thus, in the circular embodiment, the clarifier units of the McCann Patent also lose valuable separation area.

In addition, the McCann units must provide circumferential support transverse to the radial direction (i.e., in a circular or longitudinal direction) of the basin. The circumferential support is provided by cables which are spaced from and extend under the separator units. The cables are tightened by turnbuckles.

Thus, the teaching of the McCann Patent requires; (1) space below each separator unit for either lower support pipes, pipe T's and L angles; or lateral spacer cables and turnbuckles; (2) blocking of short circuit flow through the tubes via two horizontal members; and (3) cutouts in the separator structure to receive the vertical support pipes. An additional limitation of the McCann support structure is that each L angle is under the edge of each separator, which not only concentrates the vertical support stress on the radially extending corners of the truss-like structures, but blocks flow into the pipes at the edges of the separator.

Other separator systems allow separator modules to be directly adjacent to each other. However, one such system uses stainless steel supports having an equilateral triangular cross section with a longitudinal pipe at each apex. Transverse pipes extend between the longitudinal pipes at regular intervals, and diagonal braces extend longitudinally from an apex at one location to an apex at a next location. Although such equilateral triangular trusses have an open framework, they are positioned completely under the separator to provide support. As a result, a substantial (e.g., 36 inches) amount of depth below the bottom of the separator is used for separator support, which can interfere with the operation of sludge collection apparatus which scrapes the bottom of the basin below the separator. Further, since no part of the triangular truss extends above the separator unit, a separate column must extend through a separator unit, or must extend between adjacent separator units to support troughs above the units. This either blocks some tubes of the unit, or requires the units to be cut out, and in any event requires separate structure (in addition to the truss) to support the trough.

SUMMARY OF THE PRESENT INVENTION

Applicant has studied prior clarifiers and supports therefor in an endeavor to provide a truss/clarifier structure which: (1) minimizes interference with clarifier and sludge removal operations; (2) provides transverse and lateral support for the clarifier within the clarifier units; and (3) requires no additional columns for supporting effluent troughs.

The present invention seeks to overcome the long-felt problems of prior clarifier supports by integrating a longitudinal truss structure into transversely extending self-supporting clarifier units. In particular, these studies indicate that an inverted-T-shaped, open framework truss may be integrated within the structure of self-supporting, truss. like clarifier units to avoid using substantial space below the truss/clarifier structure. Despite such integration, no short circuits are formed, thus none need be blocked, and minimal tubular flow is blocked by the truss structure. Support along orthogonal planes is provided by the truss, and the truss directly supports an effluent trough. The truss is easily adapted to form a head baffle which supports one end of a first row of clarifier units nearest an inflow pipe.

In contrast to prior clarifier units which are spaced longitudinally and transversely from each other to provide room for supports, or which are mounted on trusses which extend deep into clarifier basins below the units, a general object of the present invention is to integrate an open framework truss within the structure of adjacent clarifier units without substantial blockage of flow through the clarifier units.

Consistent with the general object, the present invention provides an array of closely-spaced clarifier units, with adjacent ends of pairs of such units supported by a common inverted-T-shaped truss which extends between such adjacent ends and for a minimal depth below such adjacent ends.

A further object of the present invention is to provide a truss extending longitudinally across a clarifier basin for supporting transversely extending, close-packed clarifier units without taking substantial space below such units while providing transverse support within such units.

Another object of the present invention is to provide relatively small diameter pipes above and below close-packed Clarifier units, which pipes are connected by an inverted-T-shaped structure which permits substantially all of the liquid flowing in one clarifier unit to flow directly into the next adjacent clarifier unit.

An additional object of the present invention is to provide truss structures integrated with clarifier units, where each truss structure directly supports an effluent trough for removing clarified liquid from a clarifier basin.

Yet another object of the present invention is to provide a truss structure having a vertical spine formed by an open framework, but which may be formed by thin sheet material to for a head baffle integral with the truss when the truss supports the front end of a row of clarifier units nearest an influent pipe to a clarifier basin.

With these and other objects in mind, the present invention relates to apparatus for clarifying liquid. The apparatus for clarifying the liquid is used in a detention basin for containing flowing liquid and solids suspended therein. Close packed clarifier units are suspended below an upper surface of the liquid yet are spaced by a substantial distance from a bottom of the detention basin. A pipe extends under one end of each of two abutting clarifier units. Transverse and diagonal thin webs extend from one of the pipes to the other of the pipes. A longitudinal tension member extends between and parallel to the two pipes. The vertical spine is formed by posts which, at spaced intervals equal to the width of two adjacent clarifier units, extend upwardly from the longitudinal tension member to a third pipe which is parallel to the first two pipes.

Transverse support is provided by thin members which extend transversely and diagonally downward from the third pipe to each of the first and second pipes. The thin members are in tension, whereas the vertical posts are in compression. Because of the thin dimensions of the diagonal and transverse support members, such members take up only a minimum of volume and only block a relatively small area of the tubes which extend from one adjacent clarifier unit to the next adjacent clarifier unit. Similarly, the diagonal transversely extending members of the spine do not substantially interfere with the tubes of transversely adjacent clarifier units and such units abut except at the location of the diagonal members.

The vertical posts and the transverse diagonal support members mount the third pipe at a given position above the top of the abutting clarifier units, yet within the clarified liquid which has flowed upwardly from the clarifier units. An effluent trough may be secured directly to the third pipe with a U-shaped sheet providing lateral support for the effluent trough.

When the integral truss and clarifier units are at the influent end of a clarifier basin, the spine, including the longitudinal diagonal support members and the vertical posts, may be closed-in by a vertical sheet. The vertical sheet blocks the horizontal flow of liquid and suspended solids, forcing the liquid with the suspended solids to flow under the clarifier units and upwardly therethrough. The solids settle in the clarifier units, allowing clarified liquid to flow above the clarifier units and into the troughs.

BRIEF DESCRIPTION OF THE DRAWINGS

Other objects, features and advantages of the present invention will be apparent from an examination of the following detailed descriptions, which include the attached drawings in which.

DETAILED DESCRIPTION OF THE PREFERRED EMBODIMENTS

Figure 1A:
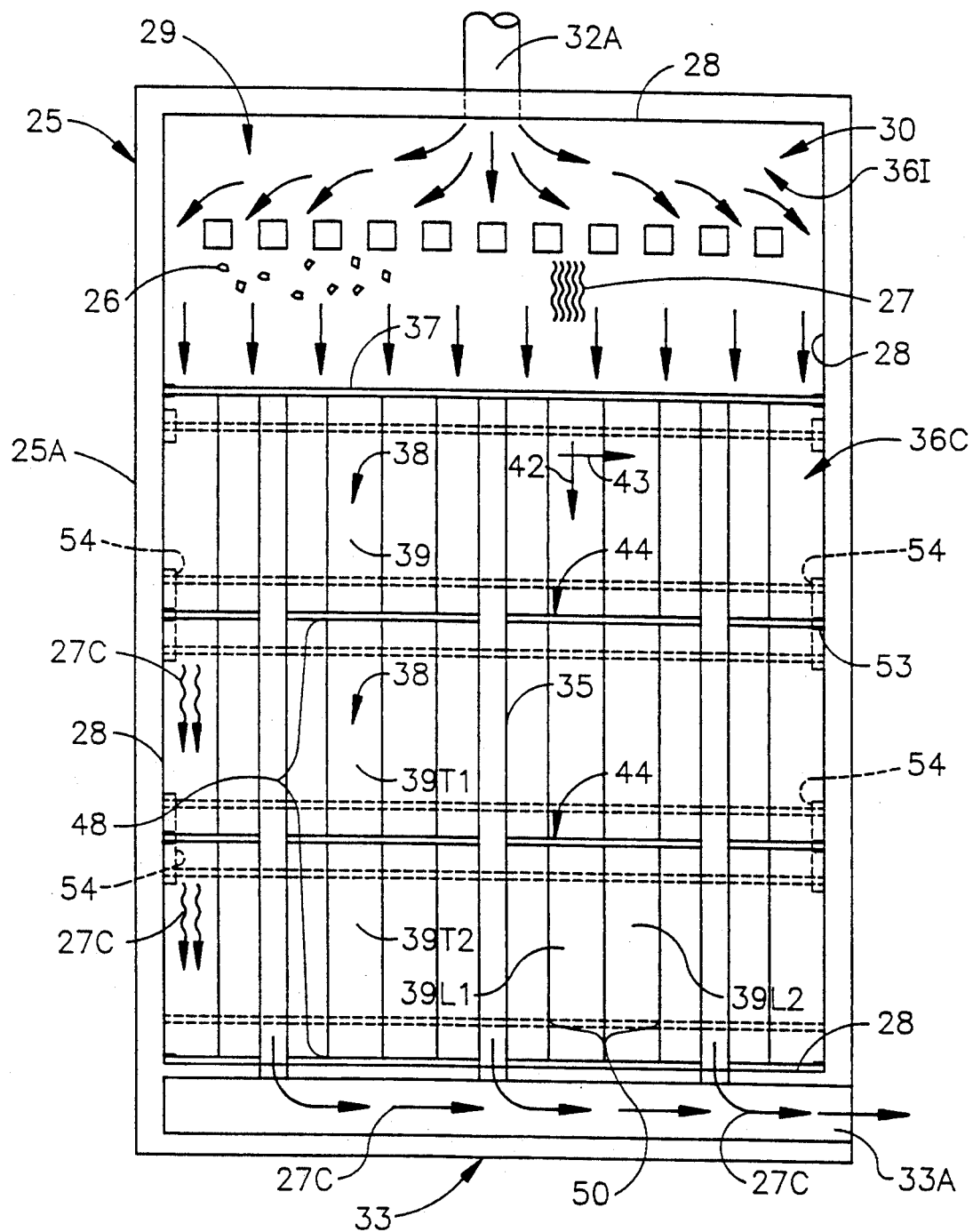
FIG. 1A is a plan view of a rectangular detention basin showing an inlet section which supplies particle-laden liquid to a clarifier section provided with self-supporting clarifier units.
Figure 1B:
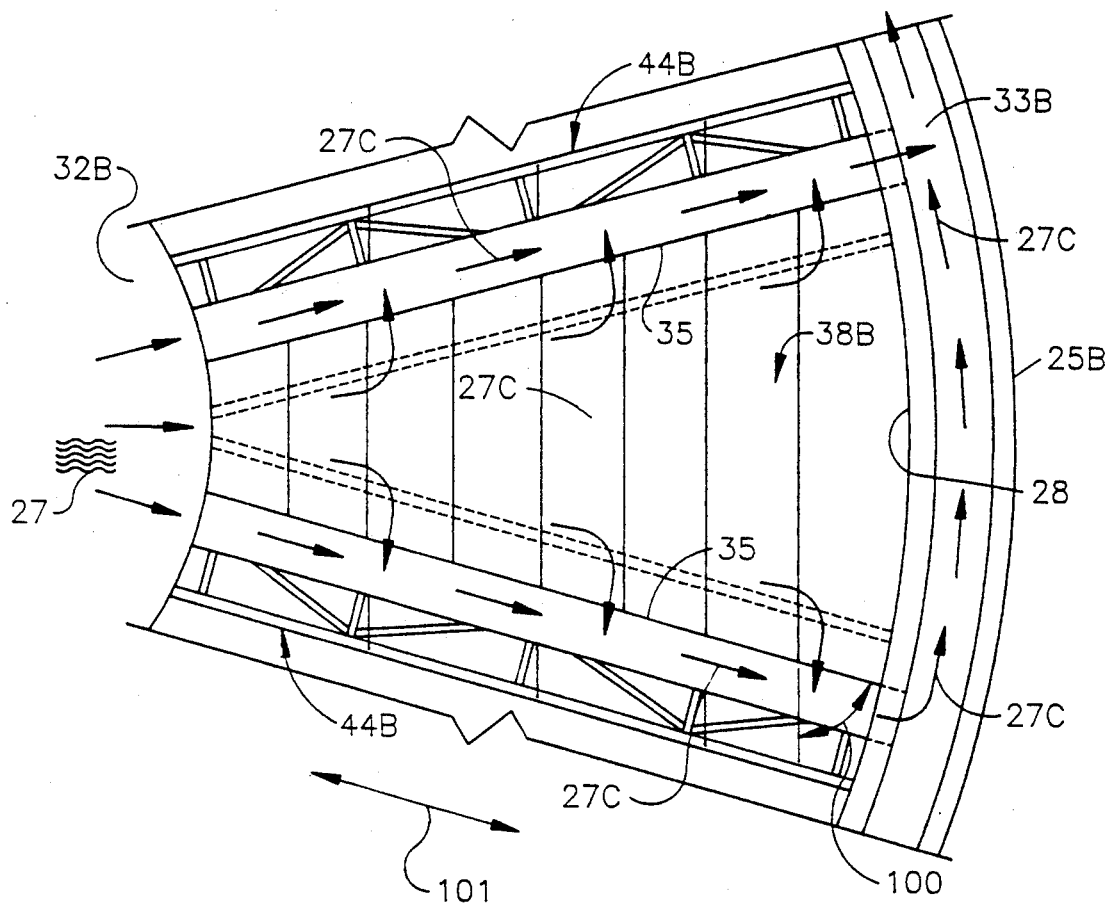
FIG. 1B is a plan view of a circular detention basin also provided with such clarifier units.
Figure 1C:
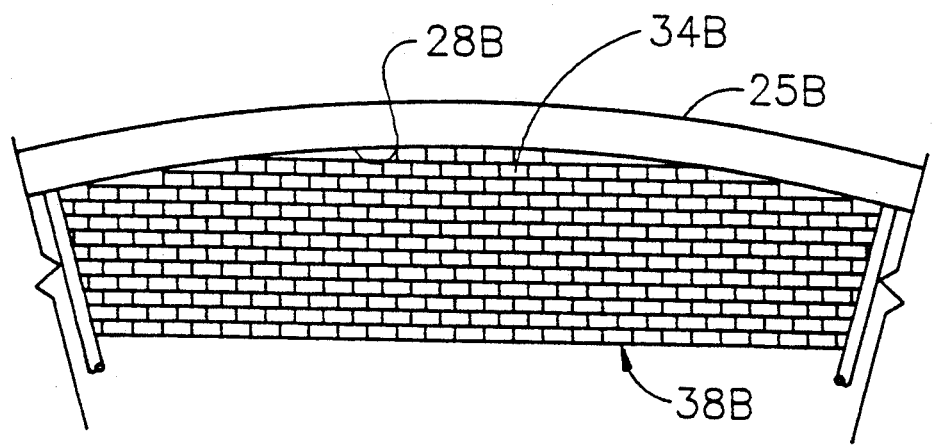
FIG. 1C is a plan view of an enlarged portion of the circular detention basin shown in FIG. 1B, illustrating short clarifier units abutting a curved outer wall of the basin.
Figure 1D:
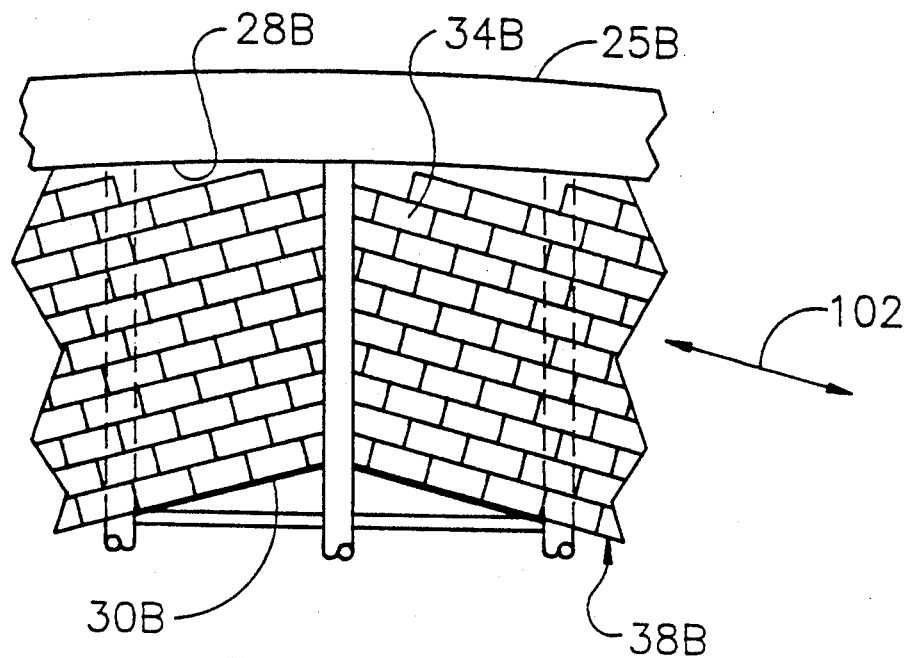
FIG. 1D is a plan view of an enlarged portion of the circular basin shown in FIG. 1C, illustrating an outer portion of a truss which supports adjacent clarifier units.
Figure 11:
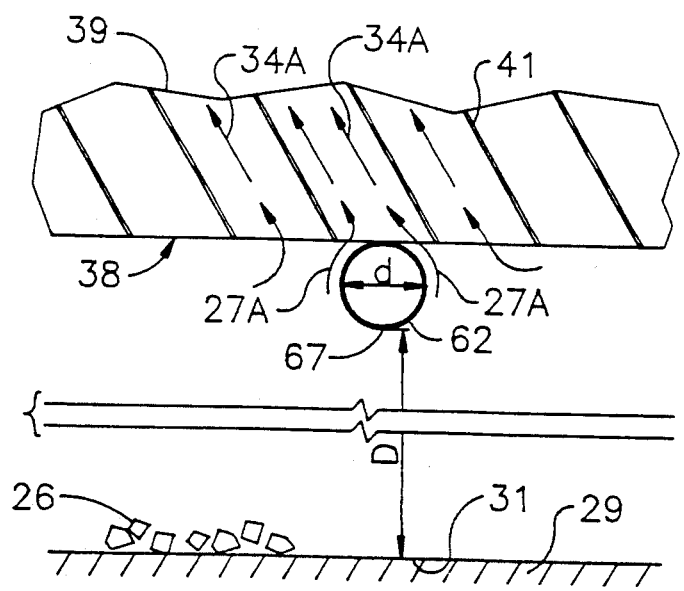
FIG. 11 is an enlarged view of a portion of FIG. 8 showing a pipe of the truss in tangential contact with the bottom of a clarifier unit to allow the liquid and particles to flow into the flow paths, where a diameter "d" of the pipe is small relative to the distance "D" from the bottom of the pipe to the bottom of the detention basin.

Referring to FIG. 1A, a clarifier 25 is shown for removing materials such as solids or particles 26 from liquid or fluid 27. The clarifier 25 is shown including vertical outer walls 28 which define a detention basin 29 having an open top 30 and a bottom 31 (FIG. 11). One embodiment of the clarifier 25 is shown in FIG. 1A and is referred to as a rectangular clarifier 25A. Another embodiment of the clarifier 25 is shown in FIGS. 1B, 1C and 1D and is referred to as a circular clarifier 25B. The clarifier 25 may have other shapes, such as square, and be used with the present invention. References to the clarifier 25 apply to all embodiments of the clarifier.

Figure 2:
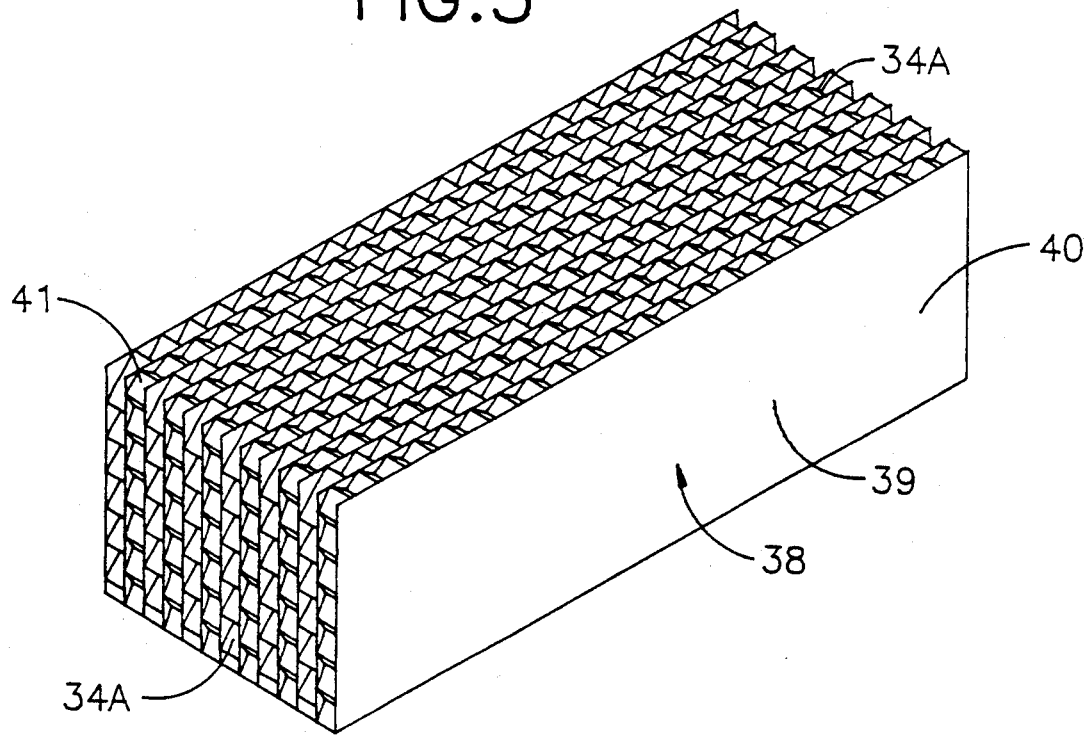
FIG. 2 is a perspective view of one of the self-supporting clarifier units shown in FIG. 1A, illustrating tubes which define flow paths.

Referring to FIGS. 1A through 1D, as the liquid 27 and the solids 26 flow through the detention basin 29 from an inlet 32A (FIG. 1A) or an inlet 32B (FIG. 1B) to an outlet 33A (FIG. 1A) or 33B (FIG. 1B), the flow of the liquid 27 and the solids 26 is substantially reduced according to the principles of the present invention to form many very low flow rate, or quiescent, zones 34 (see zones 34A in FIGS. 2 and 3 and zones 34B in FIGS. 1C and 1D) in the clarifier 25. The liquid 27 and the solids 26 flow upwardly (see liquid/solids flow arrow 27A in FIG. 11, for example) in the quiescent zones 34A so that the solids 26 settle out of the liquid 27 and the resulting clarified liquid (represented by arrows 27C in FIGS. 1A and 1B), flows to the outlets 33 of the clarifier 25. The outlets 33 may be in the form of troughs 35.

As shown in FIG. 1A, the detention basin 29 is divided into two sections (generally referred to by the reference number 36), by a head baffle 37, to provide an inlet section 36I and a clarifier section 36C. The liquid 27 and the solids 26 suspended therein flow through the inlet 32A into the inlet section 36I of the detention basin 29. As shown in FIG. 1A, they spread out and flow along the bottom 31 (FIG. 11) toward the head baffle 37. The head baffle 37 causes the liquid 27 and the solids 26 to flow into the clarifier section 36C only along the bottom 31 (FIG. 11) for flow upwardly (see liquid/solids arrow 27A in FIG. 11) into the clarifier section 36C as described below.

Clarifier 25

Figure 3:
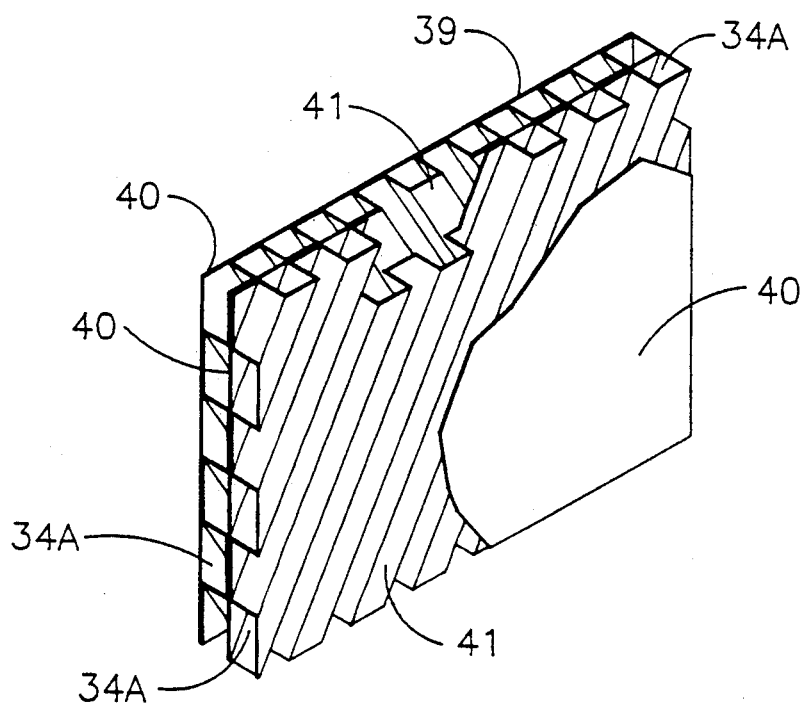
FIG. 3 is an enlarged view of the clarifier unit shown in FIG. 2, illustrating the tubes in sets, where the tubes of one set are inclined in one direction and the tubes of an adjacent set are inclined in an opposite direction.
Figure 4:
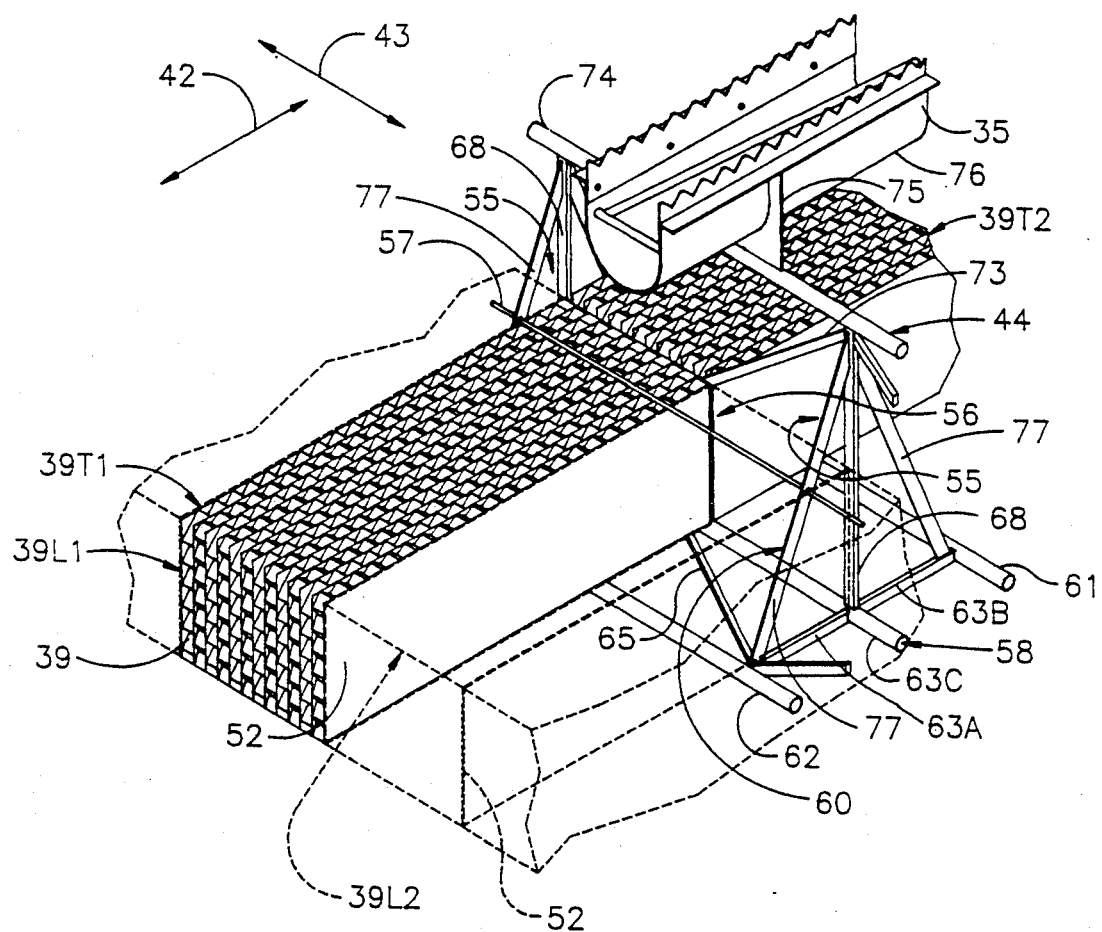
FIG. 4 is a perspective view of a clarifier unit of the present invention fabricated integrally with an inverted-T-shaped, open framework truss.

For clarifying the liquid 27, the clarifiers 25A and 25B may be provided in the form of various clarifier units 38. For example, in FIGS. 2 and 3 a self-supporting tube settler unit 39 is shown. The unit 39 may be as shown in the McCann U.S. Pat. No. 3,491,892, fabricated from vertical sheets 40 (FIGS. 2 and 3) spaced by many channel-shaped baffles 41 to form the quiescent zones (or flow paths) 34A. Such baffles 41 which extend between adjacent sheets 40 form the flow paths 34A which extend in one diagonal direction as shown in FIG. 3. The baffles 41 between the next adjacent sheets 40 (and thus the flow paths 34A defined thereby) extend in an opposite diagonal direction. The units 39 are shown in FIGS. 1A and 4 extending in a transverse direction 42, perpendicular to a longitudinal direction 43 in which inverted-T-shaped, open frame trusses 44 extend.

Figure 12:
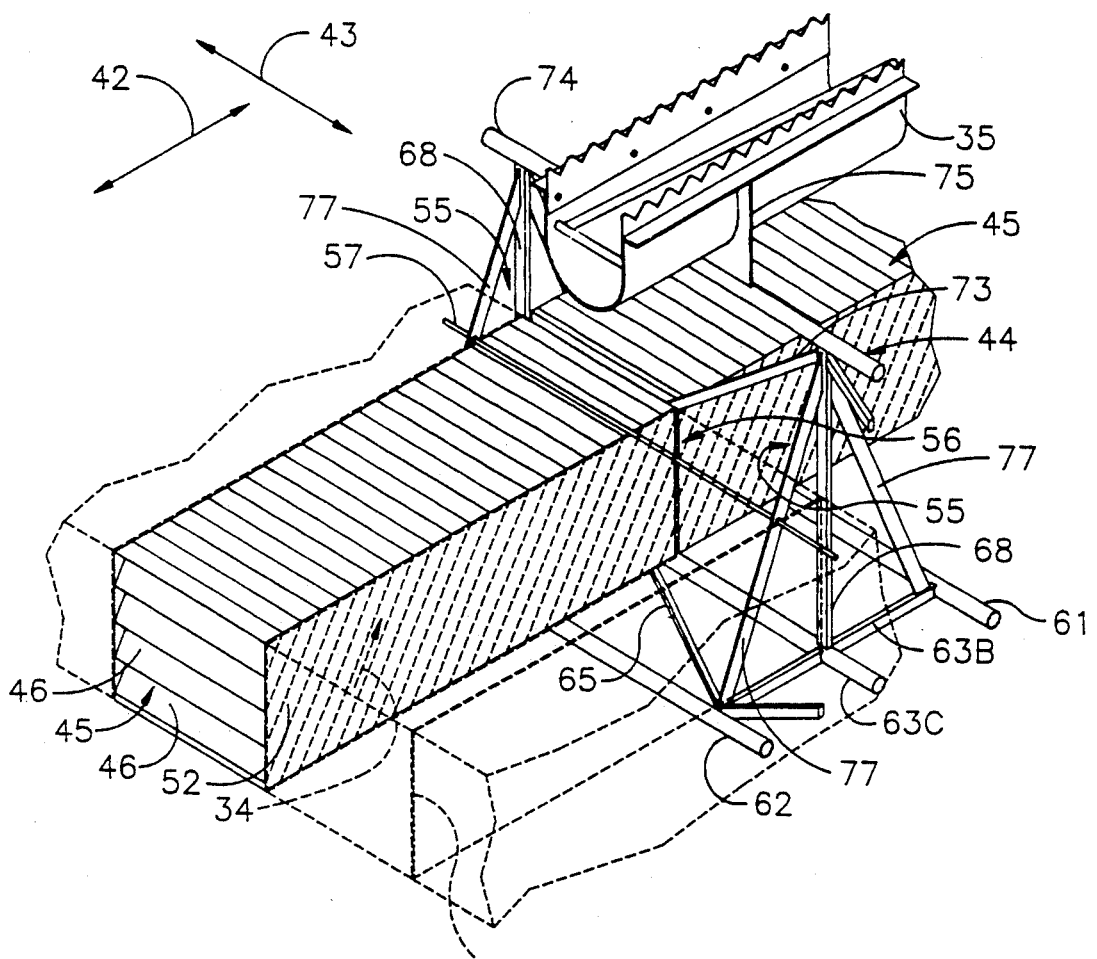
FIG. 12 is a perspective view of a second embodiment of a clarifier unit in the form of a self-supporting plate settler with a truss integral therewith.
Figure 13:
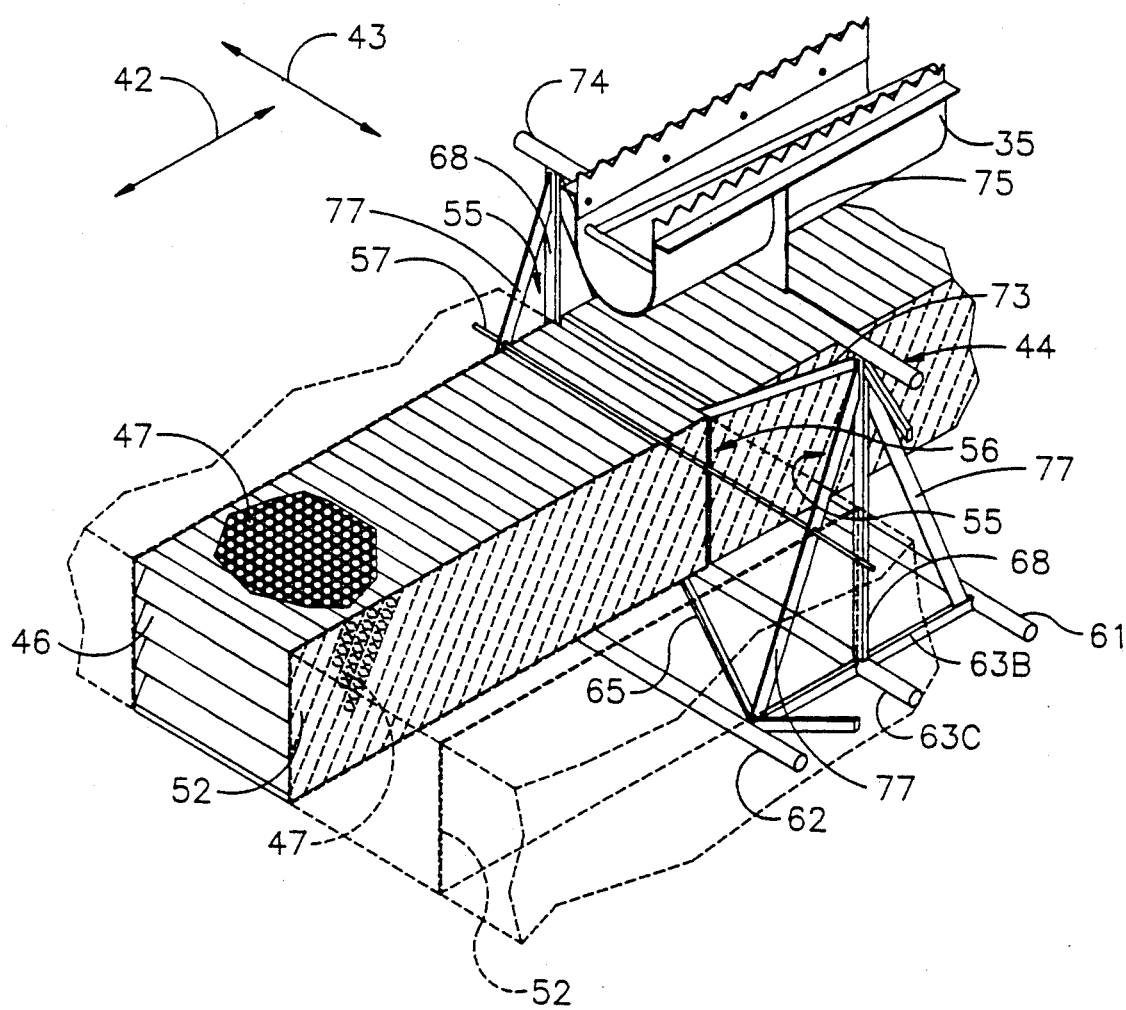
FIG. 13 is a perspective view of a third embodiment of a clarifier unit in the form of a self-supporting plate settler having three-dimensional members in each flow path to provide interstices to promote settling of solids.

Alternatively, the clarifier units 38 may be in the form of plate separators 45 shown in FIG. 12. The plate separators 45 may include plates 46 which extend at an angle relative to vertical and are closely spaced to form the flow paths 34. Such plates 46 may be used alone (see U.S. Pat. No. 4,933,524, for example) as shown in FIG. 12. Alternatively, as shown in FIG. 13 three-dimensional members 47 may be located between adjacent plates 46 to provide smaller flow paths 34 or interstices (also see U.S. Pat. No. 4,933,524).

Referring to FIGS. 1A, 4 and 9–11, the clarifier units 38 extend in the transverse direction 42 in the detention basin 29. According to an object of the present invention, the area of the open top 30 defined by the walls 28 of the basin 29 is used to a maximum extent for clarifying the liquid 27. In particular, as shown in detail in FIG. 9, the clarifier units 38 (in the form of the tube settler units 39) abut in both the transverse direction 42 and the longitudinal direction 43. Considering a pair 48 of two tube settler units 39T1 and 39T2 which abut in the transverse direction 42 (FIGS. 8 and 9), common ends 49 thereof abut so that the flow paths 34A thereof are aligned to permit the clarified liquid 27C to flow (see arrow 27C in FIG. 8) out of the clarifier unit 38 upwardly into the trough 35. Because the common ends 49 abut, there is no extra space between the common ends 49 of the adjacent abutting settler units 39T1 and 39T2. This tends to minimize the area of the open top 30 which is not usable for clarifying purposes.

Figure 9:
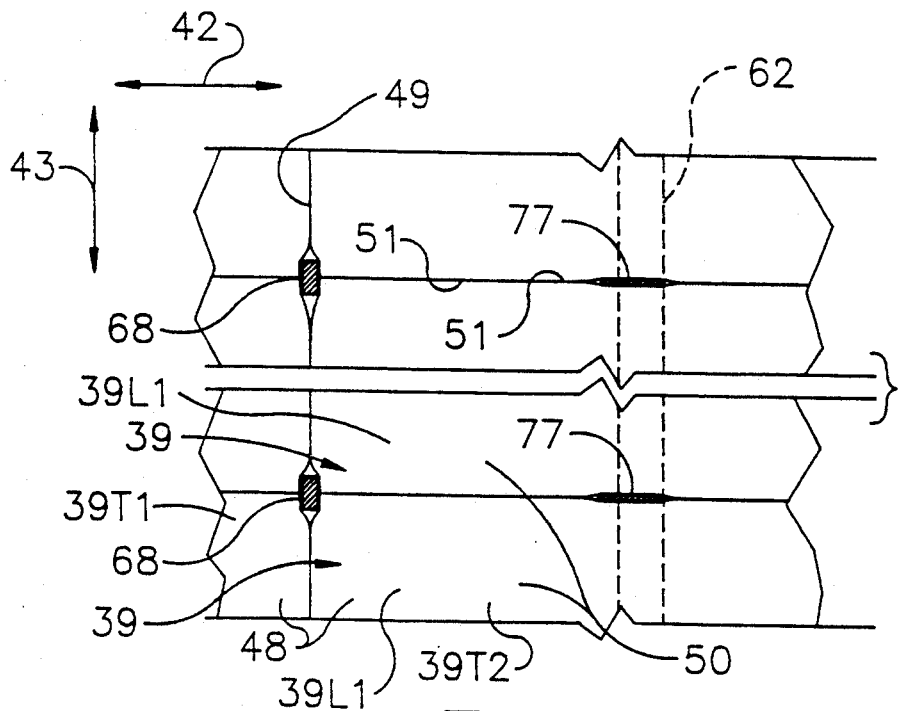
FIG. 9 is a cross-sectional plan view taken along line 9—9 in FIG. 8 showing ends and sides of adjacent clarifier units abutting except where portions of the truss extend.

Similarly, as shown in FIGS. 1A and 9, considering a pair 50 of two tube settler units 39L1 and 39L2 which abut in the longitudinal direction 43, common sides 51 thereof abut so that there is no extra space between the common sides 51.

As described in more detail below, there is no "extra" space between the common ends 49 or the common sides 51 because those respective ends or sides either directly abut one another, or directly abut the portion of the truss 44 therebetween. Significantly, because of such abutting, there is no flow path or "short circuit" space through which the liquid 27 may flow so as to bypass the units 39T1, 39T2, 39L1 or 39L2. This tends to minimize the area of the open top 30 which is not available for clarifying purposes.

First Embodiment of Truss 44

Figure 6:
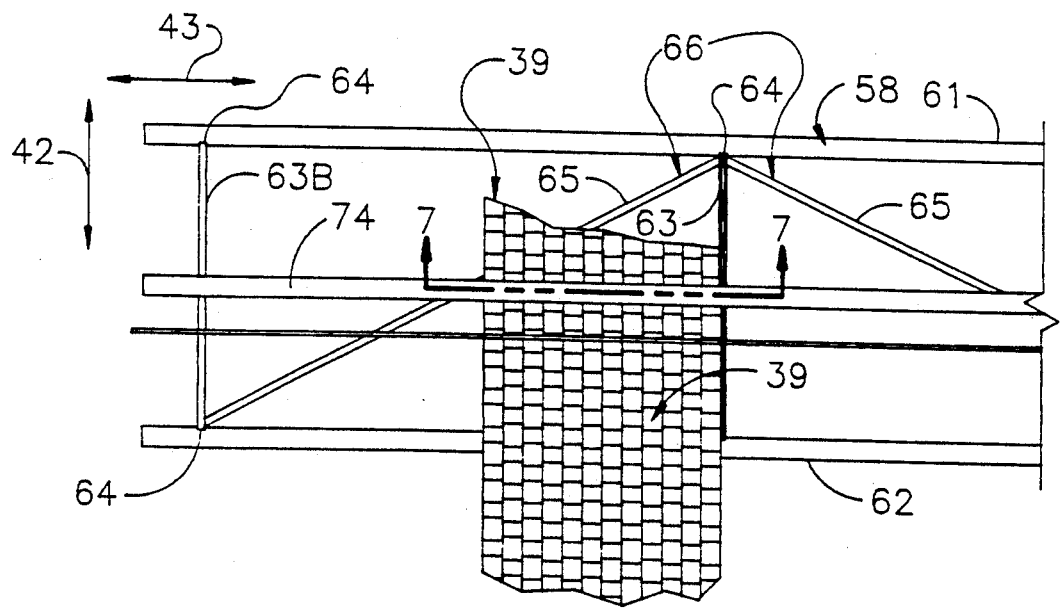
FIG. 6 is an enlarged plan view of one end of a clarifier unit supported in a three-sided corner of the truss.
Figure 7:
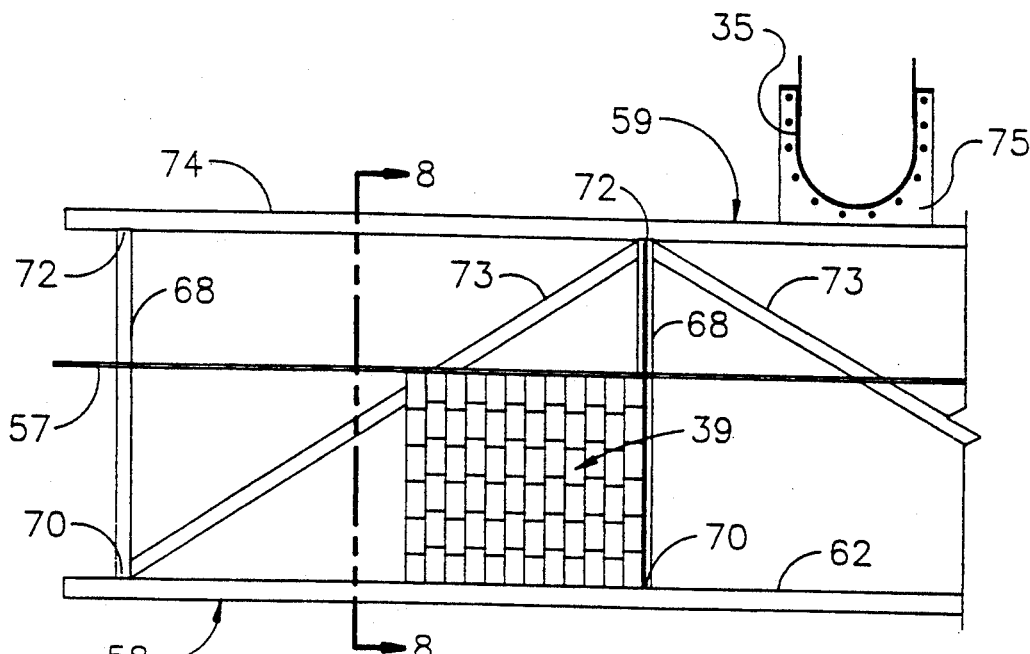
FIG. 7 is an elevational view taken along line 7—7 in FIG. 6 showing a spine of the truss which extends longitudinally across the basin to support many of the clarifier units.
Figure 8:
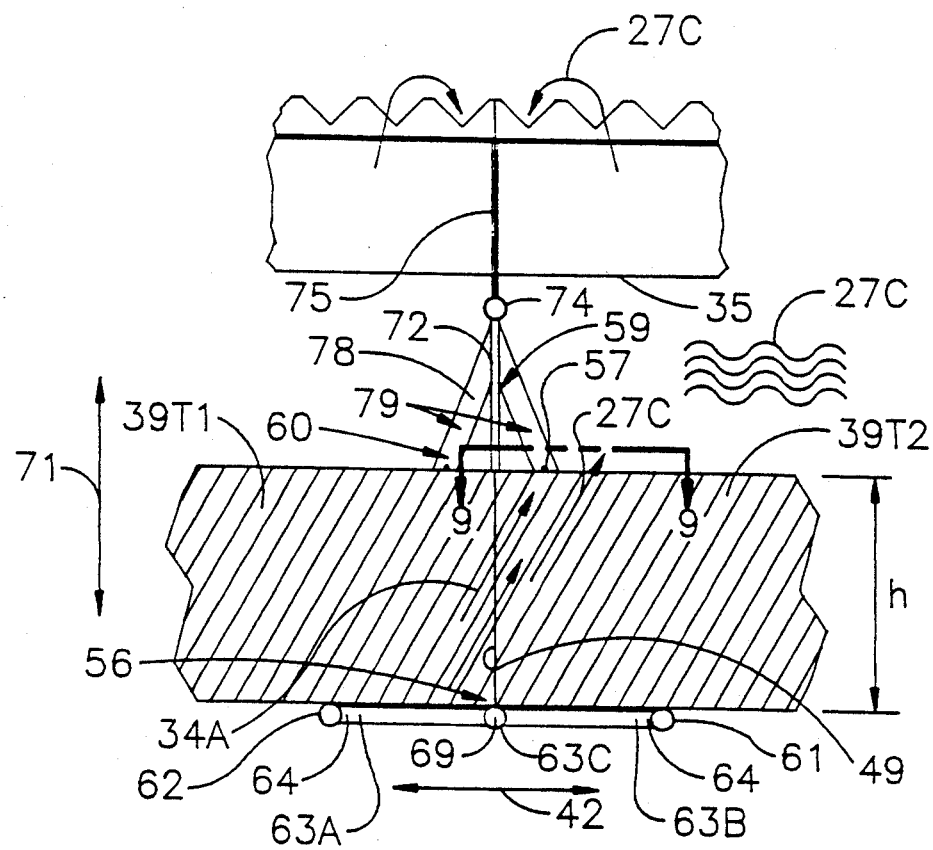
FIG. 8 is a side elevational view taken along line 8—8 in FIG. 7 showing transverse supports extending between adjacent clarifier units.

Referring to FIGS. 1A, 4 and 6 through 13, one of the trusses 44 is positioned at spaced locations along the opposite outer walls 28. Each end 53 of each truss 44 is supported on a pedestal or pad 54. In the embodiment shown in FIG. 4, adjacent end portions 52 of the two units 39L1 and 39L2 are supported in side-by-side relation in opposite three. sided corners 55 which are spaced by a two-sided corner 56. The clarifier units 38 are secured to the trusses 44 by tie down rods 57 (FIGS. 4 and 8).

In greater detail, each truss 44 includes a base 58 (FIGS. 6 and 7), a longitudinal frame 59 (FIGS. 7 and 8) and a plurality of transverse supports 60 (FIG. 8). Referring to FIGS. 4 and 6, the base 58 includes a pair of parallel pipes 61 and 62 which are held in parallel position relative to each other by spreaders 63A and 63B secured (as by welding) to a central base pipe 63C which extends longitudinally and parallel to the pipes 61 and 62. The spreaders 63A and 63B are spaced longitudinally generally by the width of two abutting, side-by-side units 39L1 and 39L2. Opposite ends 64 of each spreader 63A and 63B are secured (as by welding) perpendicularly to the base pipes 61 and 62. Diagonal members 65 extend from an end 64 of a spreader 63A or 63B adjacent one of the pipes 61 or 62, such as the base pipe 61, and extend diagonally to the opposite end 64 of the next adjacent spreader 63B. As shown in FIG. 6, a series 66 of such diagonal members 65 is provided to hold the base pipes 61 and 62 parallel to each other in the transverse direction 42. The members 65 may intersect the central base pipe 63C, and are secured (as by welding) thereto.

As shown in FIG. 11, the outer diameter d of the base pipes 61, 62 and 63C is small relative to a distance D from a bottom 67 of the pipes 61, 62 and 63C to the bottom 31 of the clarifier basin 29. As a result, even though the pipes 61, 62 and 63C are provided under and in supporting relationship with the clarifier unit 38, a relatively small amount of the overall distance D between the clarifier unit 38 and the bottom 31 of the clarifier basin 29 is used for supporting the clarifier units 38. Additionally, because of such relatively small diameter d, there is only tangential contact between the base pipes 61, 62 and 63C and the clarifier units 38. Such tangential contact permits the liquid 27 and the particles 26 flowing therewith (see arrows 27A) to flow relatively easily around the base pipes 61, 62 and 63C and into the flow paths 34. Thus, the vertical support provided by the trusses 44 is not in the form of a flat plate (not shown) which blocks the flow paths 34.

Still considering the first embodiment of truss 44, the longitudinal frame 59 may be thought of as a spine extending in the longitudinal direction 43. The spine 59 includes a series of posts 68 which are spaced by intervals similar to the spacing of the spreaders 63A and 63B. One post 68 extends upwardly from the central base pipe 63C at a center 69 (FIG. 8) between the spreaders 63A and 63B. Each post 68 is relatively thin in the transverse direction 42 (FIGS. 8 and 9) and is relatively short in the longitudinal direction 43 (FIG. 11). In particular, each post 68 may be $\frac{3}{4}$ inches by $1\frac{1}{2}$ inches respectively in those directions 42 and 43. A base end 70 of each post 68 is secured (as by welding) to the central base pipe 63C. The length of the post 68 in the vertical direction 71 (FIG. 10) exceeds a vertical dimension "h" (FIG. 8) of each of the clarifier units 38 as is more fully discussed below. Referring to FIG. 7, each post 68 terminates at a top end 72. A second diagonal member 73 extends from one top end 72 of a first post 68 downwardly to the base end 70 of the next adjacent post 68 to provide stability in the longitudinal direction 43. The second diagonal members 73 are alternately positioned such that adjacent second diagonal members 73 are secured to the same top end 72 of any given post 68. At the next post 68, adjacent second diagonal members 73 are connected to the same base end 70 of the post 68. A third pipe 74 is secured (as by welding) to the top end 72 of each of the posts 68. The pipe 74 is dimensioned the same as the base pipes 61, 62 and 63C. As shown in FIG. 4, the pipe 74 directly supports the trough 35. For stability, plates 75 are secured to the third pipe 74 and extend around a bottom 76 of the trough 35.

Referring to FIG. 8, the transverse supports 60 of each truss 44 are provided in the form of transversely extending third diagonal members 77. Each third diagonal member 77 is relatively thin in the longitudinal direction 43 and relatively short in the transverse direction 42. For example, the members 77 are one-half inch in the longitudinal direction 43 (FIG. 9) and $1\frac{1}{2}$ inches in the transverse direction 42. An upper end 78 (FIG. 8) of each third diagonal member 77 is secured (as by welding) to the corresponding top end 72 of one of the posts 68. Each third member 77 extends downwardly in the transverse direction 42 and is secured to the end 64 of one of the spreaders 63A or 63B (as by welding). As shown in FIG. 8, a pair 79 of the third diagonal members 77, taken with the spreaders 63A and 63B to which such third diagonal members 77 are attached, form an equilateral triangle such that at each location of the transverse supports 60 the cross sectional shape of the truss 44 is that of an equilateral triangle. On the other hand, between the locations of the transverse supports 60, that is, along the length of the two-sided corner 56, the cross sectional configuration of the open frame truss is in the form of an inverted T.

Head Baffle Type Truss

Figure 5:
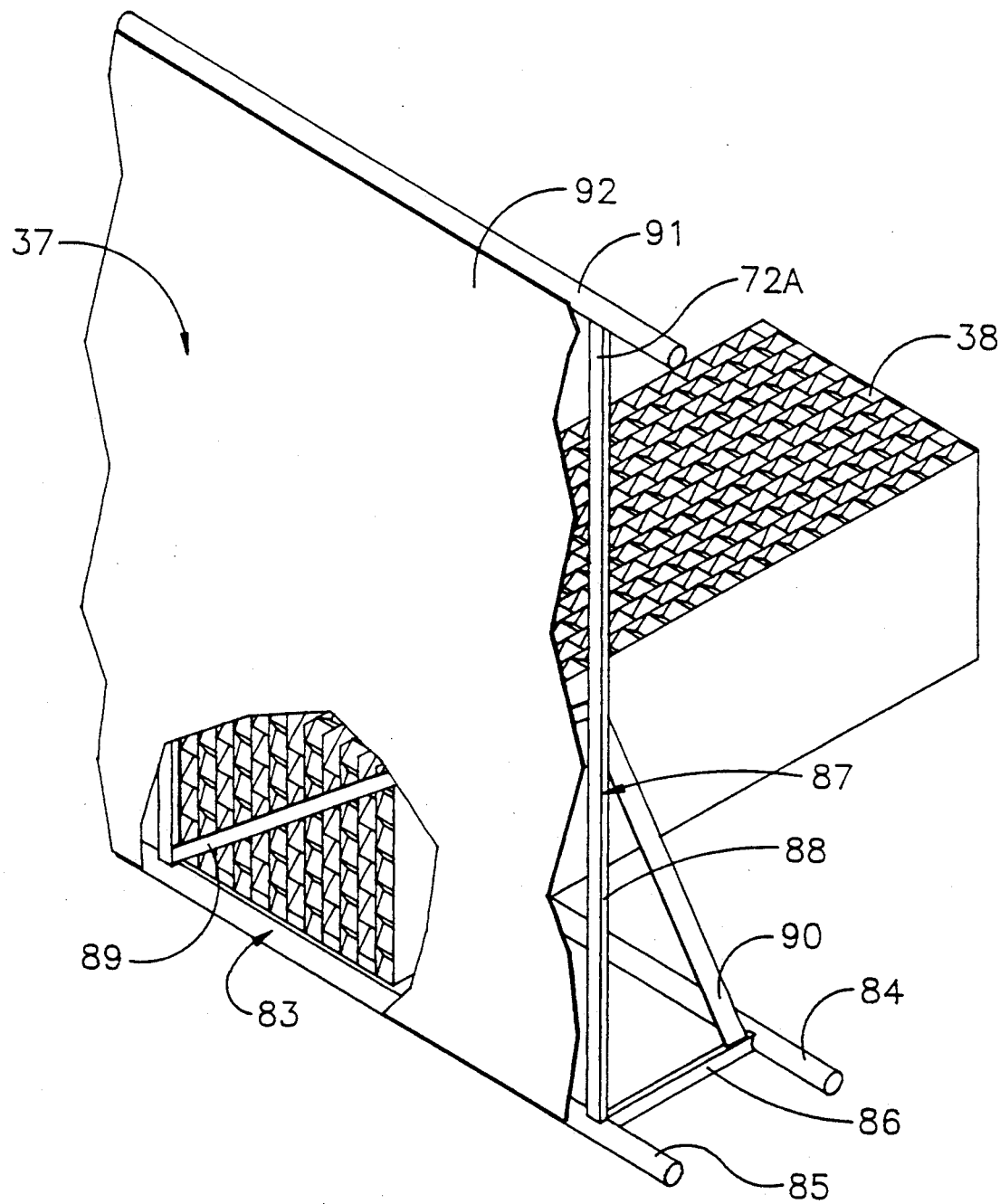
FIG. 5 is a perspective view of an open framework truss of the present invention with a longitudinal spine being closed to form a head baffle at the inlet end of the detention basin.

Referring to FIGS. 1A and 5, it may be understood that the head baffle 37 and the trusses 44 extend between opposite ones of the outer walls 28. To utilize similar construction techniques for the head baffle 37 and the trusses 44 of the clarifier 25, FIG. 5 shows a second embodiment of the truss 44 which may be used as a head baffle truss 80. The truss 80 has part of the base 58 and the transverse supports 60 of the truss 44. In particular, a base 83 of the truss 80 is shown in FIG. 5 including one base pipe 84 and one parallel pipe 85 respectively corresponding to the pipes 61 and 63C. The pipes 84 and 85 are maintained spaced by a spreader 86. A spine 87 of the truss 80 is sheet-like and is referred to as a solid spine 87. The solid spine 87 includes posts 88 spaced as in the truss 44 and diagonal members 89 as in the truss 44. The posts 88 are secured to an upper pipe 91. However, the height of the posts 88 is greater than that of posts 68 so that a vertical baffle plate 92 extends above the troughs 35 and blocks the liquid 27 as described above.

Plate Separators 45

It may be understood from the above description of the tube settler units 39 that any self-supporting clarifier unit 38 may be used according to the principles of the present invention. In particular, such unit 38 must extend in the manner of a beam from the base pipe 62 of one truss 44 to the next base pipe 61 of the next truss 44. The plate separators 45 shown in FIG. 12 may be used instead of the tube settler units 39. These separators include spaced vertical plates 94 and 95 to which opposite ends 96 of the plates 46 are secured (as by welding). This structure forms a beam capable of self-support in that the weights of the separator 45 and settled solids 26 are supported along the extent of the separator 45 from the pipe 62 to the pipe 61.

As shown in FIG. 13, the 3-D members 47 may also be used to provide the flow path 34A with interstices, or thinner paths in which the solids 26 may settle. This is as described in U.S. Pat. No. 4,933,524, without providing the variable angle of the plates 46. Instead, the basin 29 may be drained and the settled solids 26 flushed, for example, from between the plates 46.

Cylindrical Clarifier Embodiment

Referring now to FIGS. 1B through 1D, the circular clarifier 25B is shown provided with open framework, inverted-T-shaped trusses 44B of the present invention. The structure of the truss 44B is the same as that of the truss 44 shown in FIGS. 4 and 6–12. However, the clarifier units 38 extend at an angle 100 (FIG. 1B) to the longitudinal direction 101 of the truss 44B. Also, as shown in FIGS. 1C and 1D, the clarifier units 38B have staggered lengths in a direction 102 generally transverse to the direction 101 of the truss 44B. This allows the outermost units 38B to fit closely to the outer wall 28B of the cylindrical basin 29B, such that most of the area of the open top 30B of the basin 29B is used for liquid clarification.

SUMMARY

Figure 10:
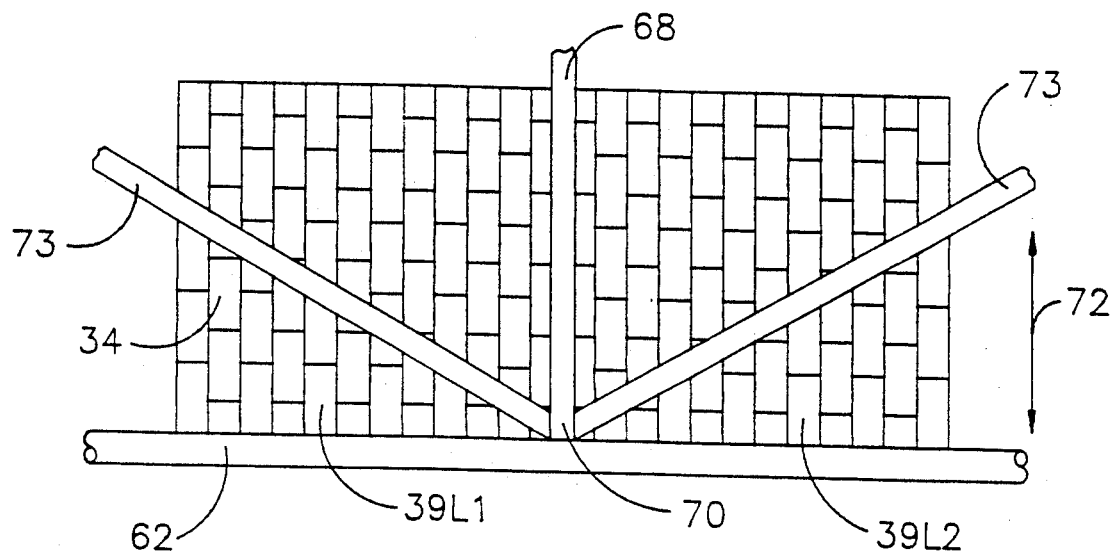
FIG. 10 is an enlarged elevational view of the ends of adjacent clarifier units showing posts and diagonals of the spine only partly blocking flow paths of the adjacent clarifier units.

It may be understood, then, that the clarifier unit 38 and the truss 44 of the present invention provide a truss/clarifier structure which: (1) minimizes interference with clarifier and solids removal operations; (2) provides transverse and lateral support for the clarifier structure within the clarifier units 38; and (3) requires no additional columns for supporting the effluent troughs 35. The present invention overcomes the problems of prior clarifier supports by integrating the longitudinal truss structure 44 into the transversely extending self-supporting clarifier units 38. The inverted-T-shaped, open framework truss 44 is integrated within the structure of self-supporting, truss-like clarifier units 38 to avoid using the substantial space D (FIG. 11) below the truss 44. Despite such integration, no short circuits are formed, thus none need be blocked, and as shown in FIGS. 9 and 10, minimal tubular flow is blocked by the structure of the truss 44. Support along the orthogonal directions 42 and 44 is provided by the truss 44, and the truss 44 directly supports the effluent trough 35. The truss 44 is easily adapted to form the head baffle 37 which supports one end of the first row of the clarifier units 38 nearest the inflow pipe 32.

While the preferred embodiments have been described by order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A settler for removing particles from particle-laden fluid flowing in an open, three dimensional space defined by a retention basin, comprising:

a plurality of generally box-like clarifier units arranged in an array, said array including at least a first pair of said units in side-by-side relationship with each other and a second pair of said units in end-to-end relationship with each other, each unit of said first pair having a first common side in side-by-side relationship with a second common side of said other unit of said first pair, each unit of said second pair having a first end and a second end, said first end of one said end-to-end unit being in end-to-end relationship with said second end of the other end-to-end unit of the second pair, said units in said side-by-side and end-to-end relationship having fluid flow passages therein for guiding said fluid upwardly to an upper surface of each said unit; and a plurality of trusses within and below said array of clarifier units to support said array in three orthogonal directions, said three directions including longitudinal, transverse and vertical directions within said basin, each said truss comprising:

first and second parallel pipes extending under and contacting said units parallel to said ends in end-to-end relationship;

spreaders extending transversely between said pipes;

first members extending diagonally between adjacent ones of said spreaders;

a post having a post end above said upper surface of said units, said post extending vertically from the center of each said spreader to said post end;

second members extending diagonally between adjacent ones of said posts and having an end terminating at one of said post ends, each of said posts and said second members being transversely thin, longitudinally short and extending between said common ends to reduce the amount of the area of said passages which is blocked thereby;

a third pipe parallel to said first and second pipes and connected to each of said post ends; and transverse braces extending diagonally from opposite sides of each of said post ends to said first and second pipes, said braces extending between said common sides and being longitudinally thin and transversely short to permit said common sides of said first pair of units to abut.

2. A settler according to claim 1, further comprising: said three pipes being arranged to be equilateral triangular in cross section.

3. A settler according to claim 1, further comprising: an additional one of said units positioned in end-to-end relationship with said one unit of said end-to-end units of said second pair, said additional unit having a first end in end-to-end relationship with said second end of said one end-to-end unit; and a second one of said trusses extending under and in contact with said first end of said additional unit and in contact with said second end of said one end-to-end unit.

4. A settler according to claim 3, further comprising: a third one of said trusses extending under and in contact with said first end of said other unit of said second pair of units.

5. A settler according to claim 1, wherein the particles which do not flow to said upper surface fall through a settling distance below said settler, said settler further comprising:

said first and second pipes having diameters which are small relative to the settling distance to occupy a minimum of space below said pairs of first and second units.

6. A settler according to claim 1, further comprising: one pair of said transverse braces being provided at each of a plurality of spaced positions along said first and second pipes, side-by-side ones of said units being mounted on one of said pipes and between adjacent ones of said pairs of said transverse braces; and a hold-down rod extending between and secured to each of said adjacent pairs of said transverse braces, said hold-down rod extending along said upper surface of said side-by-side ones of said units.

7. In an assembly including a settler unit for settling particles from particle laden fluid, and space frame trusses for supporting said settler unit in the fluid; said settler unit comprising at least four sections, first pairs of said sections being positioned transversely with respect to each other and second pairs of said sections being positioned longitudinally with respect to each other, each section having fluid flow passages for guiding relatively clear fluid to an upper surface of said sections, the improvement comprising:

each of said space frame trusses comprising a longitudinal base, a longitudinal spine and spaced transverse supports;

said base comprising:
 first and second spaced pipes extending under and vertically supporting said sections;
 a third pipe between and parallel to said first and second pipes;
 spreaders extending transversely and connecting said first, second and third pipes at spaced locations;
 and first diagonal members extending between adjacent ones of said spreaders;
 said first, second and third pipes having a relatively small diameter, said first pipe extending under one end of said second pair of sections in tangential contact therewith to support said sections in the particle-laden fluid;

said longitudinal spine comprising:
 a vertical post extending upwardly from said third pipe between said first pairs of sections, each said post being thin transversely and short longitudinally to permit said sections to abut and said flow passages to mate except where said posts extend, each said post having an upper end above said upper surface of said sections;
 second diagonal members extending between said abutting sections from one of said posts to a next of said posts;
 and a fourth pipe extending parallel to said first, second and third pipes and connected to each upper end of said posts; and
 said spaced transverse supports extending from opposite sides of said upper end of each said post between said second pairs of sections to each of said first and second pipes, said supports being longitudinally thin and transversely short to permit said sections of said second pair to abut except where said supports extend.

8. In an assembly according to claim 7, the further improvement comprising:
 an outlet supported directly on said fourth pipe.

9. In an assembly according to claim 7, the further improvement comprising:
 a rod extending longitudinally between said spaced transverse supports along said upper surface of said sections of said second pair of sections.

10. In an assembly according to claim 7, the further improvement comprising:
 one of said trusses being provided for said sections of said first pair of sections, one of said first and second pipes extending under and supporting one of said sections and the other of said first and second pipes extending under and supporting the other of said sections.

11. An assembly for processing particle-laden fluid, said processing causing the particles to settle out of the fluid onto a collection surface spaced vertically from said assembly, said assembly providing a relatively large space above said surface for collection of said settled particles, comprising:
 a basin having opposite walls which define a volume for processing said fluid;
 at least a pair of trusses, each of said trusses having opposite ends, each end being supported on one of said walls so that each truss extends longitudinally across said basin;
 each of said trusses comprising:
  a vertical span comprising a first longitudinal pipe, posts spaced longitudinally along said first pipe, said posts having bottoms, said posts having tops connected to said first pipe, and first diagonal members extending between said posts;
  a base comprising second, third and fourth longitudinally extending parallel pipes, spreaders extending transversely and connected to said second, third and fourth pipes at spaced locations, said third pipe being connected to said bottom of one of said posts, and second diagonal members extending from one end of a first one of said spreaders to another end of an adjacent second one of said spreaders; and
  vertical braces comprising third diagonal members extending from said top of each said post to one of said second and fourth pipes, said third members being longitudinally thin; and
 settler units supported on said trusses, each said settler unit comprising an elongated self-supporting box having a bottom, opposite ends, and opposite sides, each of said units having flow passages therein for processing the particle-laden fluid, said bottom of each end of said units being supported on and in tangential contact with a corresponding one of said second and fourth parallel pipes of said base of one of said trusses;
 one of said settler units being on each side of said vertical braces with said sides thereof in contact except where said third members extend; and
 one of said settler units being on each side of said vertical span, said settler units being in contact and having said flow passages thereof in flow communication except where said posts and said first diagonal members are located.

12. An assembly according to claim 11, further comprising:
 an outlet trough mounted on said first longitudinal pipe; and
 said second, third and fourth pipes having diameters which are small relative to the height of the space above the collection surface.

13. In a self-supporting settler for removing particles from particle-laden fluid, said settler spanning opposite wall of a basin in the particle-laden fluid in the basin, said settler including separate particle settler modules having fluid flow passages for discharging relatively particle-free fluid to an outlet, each of said modules being elongated in the transverse direction and having first and second opposite ends and a top; the improvement in said settler comprising:
 a plurality of open frame trusses, each truss comprising a base, a longitudinal frame, and a plurality of transverse supports;
 each said base comprising:
  a plurality of parallel pipes;
  spreaders extending perpendicularly between said pipes at intervals so that one of said spreaders at one interval is spaced from a next one of said spreaders at the next interval; and
  a first series of diagonal members extending from one of said pipes adjacent to one of said spreaders to the opposite pipe adjacent to the next one of said spreaders;
 each said longitudinal frame comprising:
  a series of posts, one post corresponding to each of said spreaders, each said post having a base end and a top end, each said post extending vertically relative to said spreaders; and a series of longitudinal diagonal members extending from one of said base ends of one said post to the top end of a next adjacent post;

each of said transverse supports comprising a second series of diagonal members, pairs of said diagonal members corresponding to each said spreader, each member of one of said pairs extending from the top end of one of said posts to the outer end of the spreader corresponding to that post;

one of said trusses being provided at each of transversely spaced locations along said opposite walls of said basin;

each of said transverse supports, longitudinal frame and base forming a series of three-sided corners spaced by a two sided corner formed by said base and said longitudinal frame;

said first end of each of said particles settler modules being received in one of said three-sided corners of a first of said trusses and extending along one of said two-sided corners, said second end of each of said particle modules being received in one of said three-sided corners of a second of said trusses and extending along one of said two-sided corners; and a tie down rod extending between said pairs of said diagonal members of said transverse supports adjacent to said top of each of said first and second ends of said modules to retain said ends in said two-sided and three-sided corners.

14. Apparatus for clarifying liquid in which solids are suspended, comprising:

a basin for receiving a flow of the liquid and the solids suspended therein, said basin having a bottom;

a plurality of clarifier units extending transversely relative to the basin and having fluid flow passages therein to promote settling of the solids to the bottom of the basin, a pair of said units being transversely adjacent to each other to define transversely adjacent common ends of said units, a pair of said units being longitudinally adjacent to each other to define longitudinally adjacent sides of said units; and a series of open frame inverted-T-shaped trusses, each truss of said series including a pipe having a given diameter and extending under one of said adjacent common ends of said transversely adjacent ones of said units so that pairs of said trusses support a given one of said units at a distance from said bottom, said distance being large relative to said given diameter, each truss of said series including an open frame extending upwardly between said transversely adjacent common ends, each said truss also including at least one thin triangular brace extending from said pipe transversely between said longitudinally adjacent sides of said units;

one said common end extending through one said open frame truss into abutting relationship with said respective adjacent common end, and one said longitudinally adjacent side extending through one said open frame truss in abutting relationship with said respective longitudinally adjacent side.

* * * * *